(12) United States Patent
Liu et al.

(10) Patent No.: US 10,780,411 B2
(45) Date of Patent: Sep. 22, 2020

(54) MULTI-CHANNEL DIRECT-DEPOSIT ASSEMBLY METHOD TO HIGH-THROUGHPUT SYNTHESIZE THREE-DIMENSIONAL MACROPOROUS/MESOPOROUS MATERIAL ARRAY

(71) Applicant: TAO TREASURES, LLC, Frederick, MD (US)

(72) Inventors: Xiaonao Liu, Frederick, MD (US); Yifeng Shi, Frederick, MD (US)

(73) Assignee: TAO TREASURES, LLC, Frederick, MD (US)

( * ) Notice: Subject to any disclaimer, the term of this patent is extended or adjusted under 35 U.S.C. 154(b) by 0 days.

(21) Appl. No.: 15/898,464

(22) Filed: Feb. 17, 2018

(65) Prior Publication Data
US 2019/0336932 A1    Nov. 7, 2019

Related U.S. Application Data

(60) Provisional application No. 62/462,297, filed on Feb. 22, 2017, provisional application No. 62/460,735, filed on Feb. 17, 2017.

(51) Int. Cl.
| | |
|---|---|
| *B01J 19/00* | (2006.01) |
| *C01B 13/36* | (2006.01) |
| *B82Y 30/00* | (2011.01) |
| *B82Y 40/00* | (2011.01) |

(52) U.S. Cl.
CPC ......... *B01J 19/0046* (2013.01); *C01B 13/363* (2013.01); *B01J 2219/00378* (2013.01); *B01J 2219/00385* (2013.01); *B01J 2219/00495* (2013.01); *B01J 2219/00527* (2013.01); *B01J 2219/00587* (2013.01); *B01J 2219/00745* (2013.01); *B01J 2219/00747* (2013.01); *B82Y 30/00* (2013.01); *B82Y 40/00* (2013.01)

(58) Field of Classification Search
CPC .......... B01J 19/0046; B01J 2219/00378; B01J 2219/00385; B01J 2219/00587; B01J 2219/00745; B01J 2219/00747; B82Y 30/00; B82Y 40/00; C01B 13/363
See application file for complete search history.

(56) References Cited

U.S. PATENT DOCUMENTS

2008/0193734 A1*  8/2008  Whitnall ............... B01J 20/282
                                                        428/221

FOREIGN PATENT DOCUMENTS

| EP | 3567131 | * 11/2019 | ............ C23C 18/12 |
| WO | WO 2017/121792 | * 7/2017 | ............ B01J 23/18 |

* cited by examiner

*Primary Examiner* — Kortney L. Klinkel
(74) *Attorney, Agent, or Firm* — Novick, Kim & Lee, PLLC; Allen Xue

(57) ABSTRACT

A multi-channel direct-deposit assembly method is disclosed to high-throughput synthesize three-dimensional macroporous/mesoporous (3DMM) material array with precisely controlled composition, pore size, and pore structure. The macropore size of the synthesized 3DMM material is in the range of 50-1000 nm; the mesopore size of the synthesized 3DMM material is in the range of 1-50 nm. The surface area of the 3DMM material is in the range of 20-1000 $m^2/g$. The 3DMM material array can be used for rapid synthesis, screening and manufacture of catalysts and nanosensors.

14 Claims, 8 Drawing Sheets

MULTI-CHANNEL DIRECT-DEPOSIT ASSEMBLY METHOD TO HIGH-THROUGHPUT SYNTHESIZE THREE-DIMENSIONAL MACROPOROUS/MESOPOROUS MATERIAL ARRAY

CROSS-REFERENCE TO RELATED APPLICATIONS

This application claims the benefit of priority under 35 U.S.C. § 119 (e) to U.S. provisional patent application Ser. Nos. 62/460,735, filed Feb. 17, 2017, and 62/462,297 filed Feb. 22, 2017. The contents of each of these applications are incorporated herein by reference in their entirety.

FIELD OF THE INVENTION

The invention relates to a multi-channel direct-deposit assembly method for inorganic nano-functional material high-throughput synthesis, in particular for producing macroporous/mesoporous material array with high-throughput.

BACKGROUND OF THE INVENTION

The three-dimensional macroporous/mesoporous (3DMM) nanostructure is a special design that creates mesoscale pores in the framework of macroscale pores. The mesopores increase the surface area and therefore provide more active sites for the reactant flow and enhance reaction effectiveness; while the macropores favor mass transfer and reduce transport limitations, therefore decrease the reaction time. Doping active elements into a macroporous/mesoporous structure substrate can greatly improve the effectiveness of catalysts and nanosensors. However, a long-standing formidable challenge in 3DMM material field is how to conduct fast and precise optimal material discovery, which if successful could have profound economic and environmental impacts. The practical way to identify best material is by high-throughput experimentation (HTE), which seeks to synthesize and test all possible combinations of material libraries. However, the big limitation for HTE is lack of fast synthesis techniques to generate large-volume, high-precision controlled 3DMM material array (compositions, pore size, and pore structure). The present invention provides such benefits.

State-of-the-art, high-throughput multi-component meosporous metal oxides have been successful reported to provide thousands of samples per day. (see Nano letters, 12, 5733, 2012) Single and multi-component 3DMM materials, such as molecular sieve (see CN 104058423B), inorganic oxide material (see U.S. Pat. No. 7,678,955, US20170129781, US20120263938), silicon dioxide (US20080193734), and carbon (see J. Phys. Chem. C, 2013, 117 (17), 8784; US20150284252) have been generated. However, these materials were fabricated one by one and optimized from only several or tens of samples. There has no method reported for high-throughput synthesizing 3DMM material array. The challenges includes (1) the dissimilar condensation kinetics and chemistry of the pore-forming agent solutions and precursor solutions of target product leading to difficulty in preparing solutions to satisfy direct-deposit, e.g. printing; (2) redox reactions, phase transformations and remove template, including bulk crystallization, can limit the stability of complexes.

BRIEF SUMMARY OF THE INVENTION

The present invention overcomes the challenges of prior efforts to high-throughput prepare controlled 3DMM material array, and provides a multi-channel direct-deposit assembly method.

These high-throughput 3DMM material arrays are prepared by multi-channel direct-deposit assembly method. The pore-forming template agent solutions are prepared preparing pore-forming template agent solutions by using one kind or a mixture of two or more kinds selected from polymer nanospheres, carbon blacks, carbon nanotubes, carbon nanofibers, carbon nanospheres, and poly(methyl methacrylate) (PMMA) microspheres, polystyrene nanosphere, latex spheres, and inorganic nanoparticles, silica nanoparticles, carbon nanoparticles, carbon dots, carbon nanocells, polymer, and amphoteric solvent. The precursor solutions to generate a target product are prepared by using one kind or a mixture of two or more kinds of metal species, graphene oxide, MXene, carbon nanotubes, metal nanoparticles, organosilicate, polymer, and amphoteric solvent. At least one of the precursor solutions and at least one of the pore-forming template agent solutions as dots were deposited onto a substrate to generate an as-synthesized array. Each dot has independent compositions of at least one of the precursor solutions and at least one of the pore-forming template agent solutions. Evaporating the amphoteric solvent, the composite meso/macrostructures can be formed into as-synthesized film array. The pore-forming template was removed by calcination in air for organic species, and/or by NaOH or HF aqueous solution, for silica, to generate the desired and controlled 3DMM material array.

In accordance with a further embodiment of this invention, the high-throughput 3DMM material array high-throughput synthesized with multi-channel direct-deposit assembly method comprises metal oxide composites, metal/metal oxides composites, metal/reduced graphene oxide (rGO) composites, metal oxide/rGO composites, metal/carbon nanotube (CNT) composites, metal oxide/CNT composites, metal/Mxene composite, and metal oxide/Mxene composite. The 3DMM material array can be used for the rapid synthesis, screening and manufacture of catalysts and nanosensors. The macropore size of the synthesized 3DMM material is in the range of 50-1000 nm; the mesopore size of the synthesized 3DMM material is in the range of 1-50 nm. Both of the macropore and the mesopore are open pores and these pores are connected with each other to form a continuous 3D pore space. The surface area of the 3DMM material is in the range of 20-1000 m$^2$/g.

The invention provides a multi-channel direct-deposit assembly method for creating a patterned array of 3DMM materials or its array consists of different combinations (e.g binary, ternary, quaternary, or more complex metal oxides, and metal/metal oxides composites, metal/reduced graphene oxide (rGO) composites, metal oxide/rGO composites, metal/CNT composites, metal oxide/CNT composites metal/Mxene composite, metal oxide/Mxene composite) and multi-digit precision compositions quickly and quantitatively.

The amphoteric solvent may be one kind or a mixture of two or more kinds selected from water, alcohol, acid, alkali, and acetone. The alcohol may be one kind or a mixture of two or more kinds selected from methanol, ethanol, propanol, butanol and glycerol. The acid may be one kind or a mixture of two or more kinds selected from formic acid, acetic acid, nitric acid, hydrochloric acid, sulfuric acid, and citric acid. The alkali may be one kind or a mixture of two or more kinds selected from ammonia, sodium hydroxide, potassium hydroxide. The metal species precursors may be one kind or a mixture of two or more kinds selected from main group, transition, lanthanide, or actinide metal. The metal species precursors selected from nitrate, carbonate, acetate, chlorate, and alkoxide.

The multi-channel direct-deposit process selected from inkjet printing, spin coating, gravure, micro-pen, nano-fountain pen, dip-pen, screen printing, spray coating, slide coating, slot coating, curtain coating, dip coating, pipette dropping, and combinations thereof. The deposited substrates selected from paper, membrane, glass, corundum, ceramic, silicon wafer, steel, wood, quartz, circuit board, conductive materials, and combinations thereof.

The evaporation temperature is 20-500° C. The heating treatment is 100-1000° C.

More, the invention also provides a chemical vapor detection scanning instrument and method to search for materials readily and rapidly by measuring the resistance change of materials after absorption or/and reaction with chemical vapors from exhaled breath. An array of interdigitated gold or Ag electrodes will be deposited by an electron-beam evaporator on a non-conducting substrate, or by other similar deposition methods. The candidate materials with all kinds of different compositions and microstructures were deposited on top to the electrodes. The end of each electrode will be left uncovered. After depositing and calcination or other necessary pretreatment, the materials library will be ready for screening. A scanning probe will be utilized for fast screening. The probe comprises a void chamber with an open end and two back pipelines connected to gas controller parts. Two metal tips are installed on the wall. The tips are connected to a source-meter, which is further connected to a computer to collect data. During the screening process, the probe will be pressed on top of a single sample domain by a robot, and thus create a sealed chamber allowing the air to contact with the sample through the back pipeline. The metal tips of the probe will be precisely contacted with the ends of the interdigitated electrodes for resistance or current measuring at different frequency. Before the screening, the chamber will be purged by vacuum and then filled with inert carrier gas, argon/nitrogen, and the resistance of the chemiresistors will be recorded as baseline. The integrated signal when it was exposed to the gas mixture for patient and healthy reference were separately collected. The difference between the signals caused by simulated breath for patient and the healthy reference, or by the fitness person before and after exercise are regarded as the figure of merit (FOM) of the sensor material, and it is utilized to select those has potentials for next analysis. For those materials with outstanding FOM, their response to each selected biomarker will be analyzed by filling the chamber of the probe with single chemical vapors with known concentration mixed with inert carrier gas. Each identified material will again be tested with individual chemical vapors to determine its sensing mechanism. This rapid screening method can evaluate different sensor materials at a speed of 10000 samples per day.

More, the disclosure provides a sensor array based on 3D MM materials that can be used for diseases detection from human exhaled breath.

The invention provides a 3DMM material-based sensor array to detect disease in from human body odors. The diseases include but not limited to cancers (e.g. lung cancer, breast cancer, colorectal cancer, prostate cancer, gastric cancer, kidney cancer, bladder cancer, head and neck cancer, ovarian cancer), multiple sclerosis, idiopathic Parkison's, Atypical Parkinsonism, oral malodor, chronic obstructive pulmonary disease, pulmonary hypertension, crohn's disease, ulcerative colitis, irritable bowel syndrome, preeclampsia toxemia, mesothelioma, asthma, pneumonia, tuberculosis, invasive pulmonary asuremia, Parkinson disease, halitosis, pergillosis, pulmonary arterial hypertension, pulmonary sacroidosis, bacterial infections, diabetes, chronic kidney disease, etc.

BRIEF DESCRIPTION OF THE DRAWING

The inventive concepts will become more apparent in view of the attached drawings and accompanying detailed description.

DETAILED DESCRIPTION OF THE INVENTION

Figure 1:
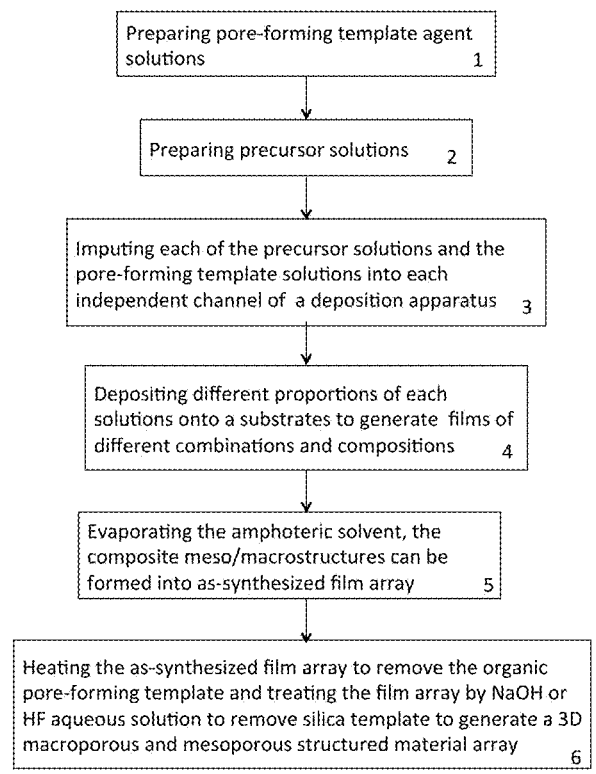
FIG. 1 shows a flow chart of multi-channel direct-deposit assembly method for high-throughput synthesizing a three-dimensional macroporous/mesoporous material array.

A high-throughput method for forming a three-dimensional macroporous/mesoporous material array is discussed below. FIG. 1 shows a flow chart of the process. In step 1, the pore-forming template agent solutions are prepared by using one kind or a mixture of two or more kinds of polymer nanospheres, carbon blacks, carbon nanotubes, carbon nanofibers, carbon nanospheres, and poly(methyl methacrylate) (PMMA) microspheres, polystyrene nanosphere, latex spheres, and inorganic nanoparticles, silica nanoparticles, carbon nanoparticles, carbon dots, carbon nanocells, polymer with amphoteric solvent. In step 2, the precursors solutions are prepared to generate a target product by using one kind or a mixture of two or more kinds of metal species, graphene oxide, MXene, carbon nanotubes, metal nanoparticles, oligomeric organosilicate (1,4-bis (triethoxysilyl) benzene, 1,2-Bis(triethoxysilyl)ethane, Bis[(3-trimethoxysilyl)propyl]amine (amine), Ethyltriethoxysilane) with amphoteric solvent. In step 3, each of the precursor solutions and the pore-forming template agent solutions are inputted into an individual one of channels of a deposition apparatus as an independent solution. In step 4, different proportions of each independent solution are deposited onto a substrate to generate different combinations and compositions of as-synthesized film on a spot of an array; Each dot has independent compositions of at least one of the precursor solutions and at least one of the pore-forming template agent solutions. In step 5, evaporating the amphoteric solvent, the composite meso/macrostructures can be formed into as-synthesized film array. And finally in step 6, heating the as-synthesized film array to remove the organic pore-forming template, and/or treating the film array by NaOH or HF aqueous solution to remove silica template, to generate a 3D macroporous and mesoporous structured material array.

Figure 2:
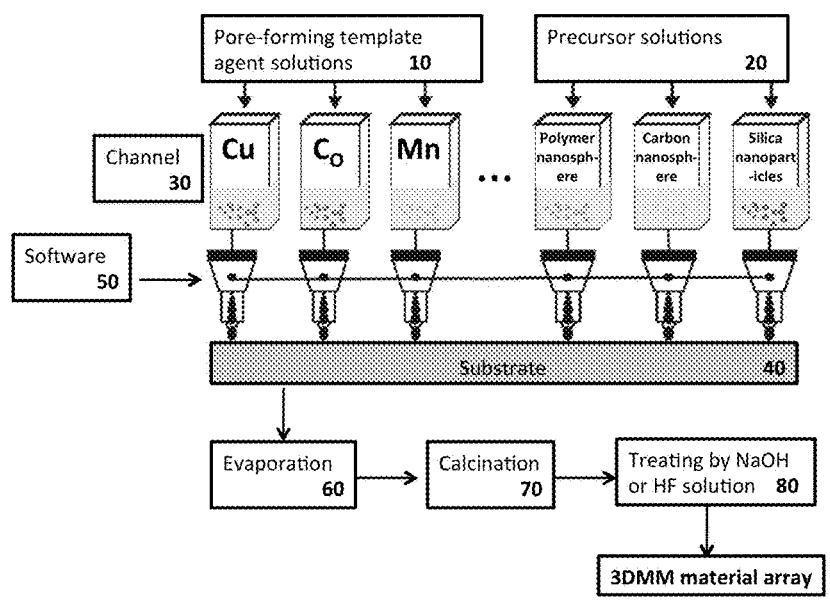
FIG. 2 shows an example schematic diagram for generating 3DMM material array.

FIG. 2 shows an example schematic diagram for generating 3DMM material array, the pore-forming template agent solutions 10, the precursor solutions 20, at each element of an array with independently controlled composition and combination. The pore-forming template agent solutions 10 and the precursor solutions 20 are inputted to each of channels 30 of a deposition apparatus. Different proportions of solutions from each channel are deposited onto a substrate 40. Software 50 controls different combinations and compositions of the solutions deposited on a spot of an array. The array is then evaporated 60 and calcined 70 to remove the organic pore-forming template, and treating 80 the film array by NaOH or HF aqueous solution to remove silica template, to generate a 3D macroporous and mesoporous structured material array.

One of examples of the preparation steps is as follows:

(1) For the pore-forming template agent solution preparation, the template agent and amphoteric solvent were uniformly mixed and stirred at 0-200° C. until a stable solution or dispersion was formed.

(2) For the precursor solutions, the precursors of a target product and amphoteric solvent were uniformly mixed and stirred at 0-200° C. until a stable solution or dispersion was formed.

(3) The pore-forming template solutions and the precursor solutions are dispensed into the each channel of the multi-channel direct deposition apparatus individually.

(4) Software programs may dispense droplets of each channel with a certain volume onto any kind of substrate to create a patterned as-synthesized thin film array with controlled compositions and combinations.

(5) The as-synthesized film array was placed at a certain temperature to evaporate solvent and form intermediate.

(6) The as-synthesized film array was calcined in a certain temperature to remove the organic pore-forming template, and/or treated by NaOH or HF aqueous solution to remove silica template, to generate a 3D macroporous and mesoporous structured material array.

The invention provides a multi-channel direct-deposit assembly method for high-throughput creating a patterned 3DMM material array comprises different combinations (e.g binary, ternary, quaternary, or more complex metal oxides, and metal/metal oxides composites, metal/reduced graphene oxide (rGO) composites, metal oxide/rGO composites, metal/CNT composites, metal oxide/CNT composites metal/Mxene composite, metal oxide/Mxene composite) and multi-digit precision compositions quickly and quantatively.

In accordance with a further embodiment of this invention, the 3DMM material array high-throughput synthesized by multi-channel direct-deposit assembly method comprises metal oxide composites, metal/metal oxides composites, metal/reduced graphene oxide (rGO) composites, metal oxide/rGO composites, metal/carbon nanotube (CNT) composites, metal oxide/CNT composites, metal/Mxene composite, and metal oxide/Mxene composite. The 3DMM material array can be used for the rapid synthesis, screening and manufacture of catalysts and nanosensors. The macropore size of the synthesized 3DMM material is in the range of 50-1000 nm; the mesopore size of the synthesized 3DMM material is in the range of 1-50 nm. Both of the macropore and the mesopore are open pores and these pores are connected with each other to form a continuous 3D pore space. The surface area of the 3DMM material is in the range of 20-1000 $m^2/g$.

The amphoteric solvent may be one kind or a mixture of two or more kinds selected from water, alcohol, acid, alkali, and acetone. The alcohol may be one kind or a mixture of two or more kinds selected from methanol, ethanol, propanol, butanol and glycerol. The acid may be one kind or a mixture of two or more kinds selected from formic acid, acetic acid, nitric acid, hydrochloric acid, sulfuric acid, and citric acid. The alkali may be one kind or a mixture of two or more kinds selected from ammonia, sodium hydroxide, potassium hydroxide. The metal species precursors may be one kind or a mixture of two or more kinds selected from main group, transition, lanthanide, or actinide metal. The metal species precursors selected from nitrate, carbonate, acetate, chlorate, and alkoxide.

The multi-channel direct-deposit process selected from inkjet printing, spin coating, gravure, micro-pen, nano-fountain pen, dip-pen, screen printing, spray coating, slide coating, slot coating, curtain coating, dip coating, pipette dropping, and combinations thereof. The deposited substrates selected from paper, membrane, glass, corundum, ceramic, silicon wafer, steel, wood, quartz, circuit board, conductive materials, and combinations thereof.

The evaporation temperature is 20-500° C. The heating treatment is 100-1000° C.

In addition, the invention provides a high-speed multiplex screening method to explore materials readily and rapidly by measuring the resistance change of materials after absorption or/and reaction with chemical vapors. More, the invention provides a sensor array based on 3D macroporous/mesoporous sensor materials that can be used for diseases detection from human exhaled breath.

Figure 3:
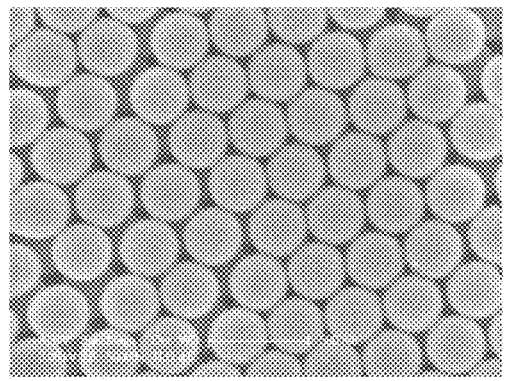
FIG. 3 shows Scanning Electron Microscope (SEM) image of silica nanospheres.

Example 1 High-Throughput Synthesis of 3DMM Quaternary $NiCoFePbO_x$ Material Array A typical high-throughput synthesis of 3DMM quaternary $NiCoFePbO_x$ material array is outlined below. We formulate six solutions respectively. Solution 1#, macropore pore-forming template solution, a silica nanosphere with diameter of ~300 nm was synthesized by Stöber process (FIG. 3). 5 g silica nanosphere was dispersed in 100 ml ethanol and stirred for 1 hour to obtain a stable dispersion. Solution 2#, mesopore pore-forming template agent solution, 1 g F127 ($EO_{96}PO_{70}EO_{96}$, MW=12000 g/mol), 10 mmol of acetic acid, 6 mmol of HCl were dissolved in the 60 ml ethanol and stirred for 1 hour at 25-60° C. to obtain a clear homogeneous solution. Solution 3#, Ni precursor, 10 mmol $Ni(NO_3)_2$ was dissolved in 60 ml anhydrous ethanol/isopropanol and stirred for 0.5 h. Solution 4#, Co precursor, 10 mmol $Co(NO_3)_2$ was dissolved in 60 ml anhydrous ethanol/isopropanol and stirred for 0.5 h. Solution 5#, Fe precursor, 10 mmol FeCl3 was dissolved in 60 ml anhydrous ethanol/isopropanol and stirred for 0.5 h. Solution 6#, Pb precursor, 1 mmol $Pb(NO_3)_2$, 0.5 mmol of acetic acid, 1 mmol of HCl and 0.8 g F127 ($EO_{96}PO_{70}EO_{96}$, MW=12000 g/mol) were dissolved in the 60 ml ethanol and stirred for 1 hour at 25-60° C. to obtain a clear homogeneous solution.

Figure 4:
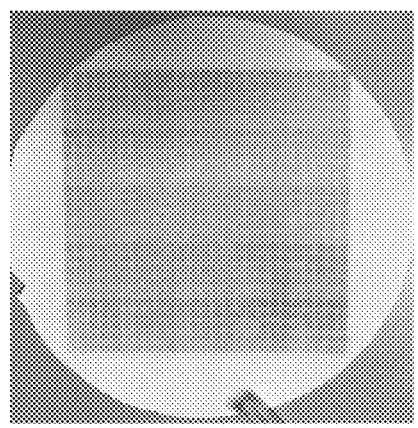
FIG. 4 shows the as-synthesized 3DMM NiCoFePbO$_x$ material array on filter paper based on multi-channel direct-deposit assembly method (ink-jet printing assembly method).

Ink-jet printing technique was chosen to deposit six precursor and pore-forming template agent solutions in this example. Each solution was injected into the containers of the printer respectively. A software program of the printer will control the volume and position of the solutions delivered on the filter paper to generate as-synthesized thin film array with different combinations and compositions, as shown in FIG. 4. The motion-controlled stage of printer has x-y-z travel distance of 1 cm-100 cm with a resolution of 100 dpi-3600 dpi and travel speeds of 1 mm-1 m/sec.

Figure 5:
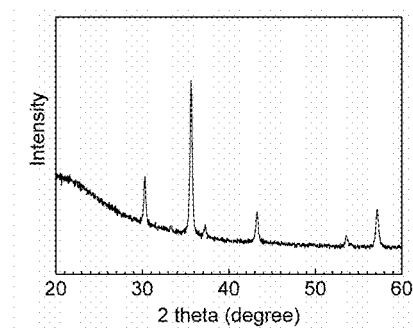
FIG. 5 X-ray diffraction (XRD) of the synthesized CoFe$_2$O$_x$ in 3D MM NiCoFePbO$_x$ array based on multi-channel direct-deposit assembly method (inkjet printing assembly method).

The printed thin film array was then heated to 60° C. After the solvent was evaporated up, the sample was calcined in a muffle furnace in air at 300-800° C. for 2 hours with a ramp of 1-10° C./min. During this calcination process, the precursors were decomposed. The silica nanospheres and silica nanoparticles were removed by treating the sample with diluted HF aqueous solution with a concentration of 1-10 wt %. The final 3D MM NiFeCoPbO$_x$ material array was thus synthesized. FIG. 5 shows the XRD analysis of the synthesized CoFe$_2$O$_x$ in 3D MM NiCoFePbO$_x$ array.

Example 2 High-Throughput Syntheses of 3DMM Ternary AgCoNiOx Material Array

A typical high-throughput synthesis of 3DMM ternary AgCoNiOx material array is outlined below. We formulate five solutions respectively. Solution 1#, pore-forming template solution, the silica nanoparticle aqueous solution with diameter of 300 nm was purchased from Sigma-Aldrich. 5 g silica nanosphere was dispersed in 100 ml ethanol, and stirred for 1 hour to obtain a stable dispersion. Solution 2#, pore-forming template agent solution, 2 g P123 (PEG-PPG-PEG, MW=5800 g/mol), 10 mmol of acetic acid, 6 mmol of HCl were dissolved in the 60 ml ethanol and stirred for 1 hour at 25-60° C. to obtain a clear homogeneous solution. Solution 3#, Ni precursor, 10 mmol Ni(NO$_3$)$_2$ was dissolved in 60 ml anhydrous ethanol/isopropanol and stirred for 0.5 h. Solution 4#, Co precursor, 10 mmol Co(NO$_3$)$_2$ was dissolved in 60 ml anhydrous ethanol/isopropanol and stirred for 0.5 h. Solution 5#, Ag precursor, 0.5 mmol AgNO3, 0.5 mmol of acetic acid, 1 mmol of HCl and 1.6 g P123 (PEG-PPG-PEG, MW=5800 g/mol) were dissolved in the 60 ml ethanol and stirred for 1 hour at 25-60° C. to obtain a clear homogeneous solution.

Glass substrates were cleaned by sonication in acetone, methanol, and deionized water for 10 min each. Then, the glass substrates were dried under 60° C. in the oven for 5 h.

Figure 6:
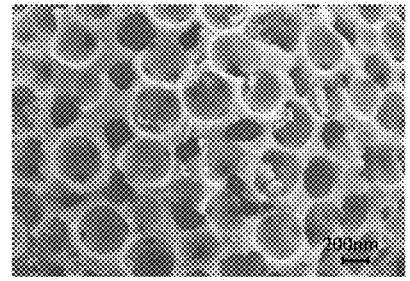
FIG. 6 SEM of the synthesized 3DMM AgCoNiO$_x$ material based on multi-channel direct-deposit assembly method (spin coating assembly method)

Each solution was deposited onto glass slides using pipette with a certain compositions and combinations. The spin coating of the films on the glass substrates was carried for 30 s at 2000 rpm. Then, the coated films were dried at 60° C. for 1 h. This procedure was repeated three times for generating a certain thickness films. After the solvent was evaporated up, the as-deposited film array was annealed for 2 h at 450° C. in an air furnace with a ramp of 2° C./min. Finally, the silica nanoparticles were removed by treating the sample with diluted HF aqueous solution with a concentration of 1-10 wt % in 10 min. The final 3D MM ternary AgCoNiOx material array was thus synthesized, according to the SEM images, as shown in FIG. 6.

Example 3 High-Throughput Syntheses of 3DMM Quaternary CuCoMnWO$_x$ Material Array A typical high-throughput synthesis of 3DMM ternary AgCoNiOx material array is outlined below. We formulate six solutions respectively. Solution 1#, macropore pore-forming template solution, a silica nanosphere with diameter of 300 nm was synthesized by Stöber process. 5 g silica nanosphere was dispersed in 100 ml ethanol, and stirred for 1 hour to obtain a stable dispersion. Solution 2#, mesopore pore-forming template agent solution, 1 g F127 (EO$_{96}$PO$_{70}$EO$_{96}$, MW=12000 g/mol), 10 mmol of acetic acid, 6 mmol of HCl were dissolved in the 60 ml ethanol and stirred for 1 hour at 25-60° C. to obtain a clear homogeneous solution. Solution 3#, Cu precursor, 10 mmol Cu(NO$_3$)$_2$ was dissolved in 60 ml anhydrous ethanol/isopropanol and stirred for 0.5 h. Solution 4#, Co precursor, 10 mmol Co(NO$_3$)$_2$ was dissolved in 60 ml anhydrous ethanol/isopropanol and stirred for 0.5 h. Solution 5#, Mn precursor, 10 mmol MnCl2 was dissolved in 60 ml anhydrous ethanol/isopropanol and stirred for 0.5 h. Solution 6#, W precursor, 1 mmol WCl$_6$, 0.5 mmol of acetic acid, 1 mmol of HCl and 0.8 g F127 (EO$_{96}$PO$_{70}$EO$_{96}$, MW=12000 g/mol) were dissolved in the 60 ml ethanol and stirred for 1 hour at 25-60° C. to obtain a clear homogeneous solution.

Glass substrates were cleaned by sonication in acetone, methanol, and deionized water for 10 min each. Then, the glass substrates were dried under 60° C. in the oven for 5 h.

Figure 7:
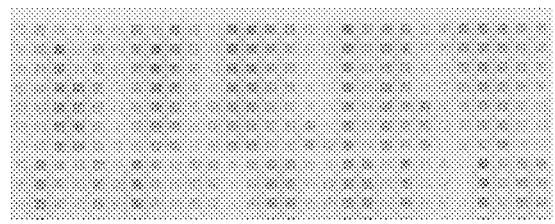
FIG. 7 Synthesized 3DMM CuCoMnWO$_x$ material array on a glass slide based on multi-channel direct-deposit assembly method (ink-jet printing assembly method).

Ink-jet printing technique was chosen to deposit six precursor and pore-forming template agent solutions in this example. Each solution was injected into the containers of the printer respectively. A software program of the printer will control the volume and position of the solutions delivered on the glass slide to generate as-synthesized thin film array with different combinations and compositions, as shown in FIG. 7. The motion-controlled stage of printer has x-y-z travel distance of 1 cm-100 cm with a resolution of 100 dpi-3600 dpi and travel speeds of 1 mm-1 m/sec.

Figure 8:
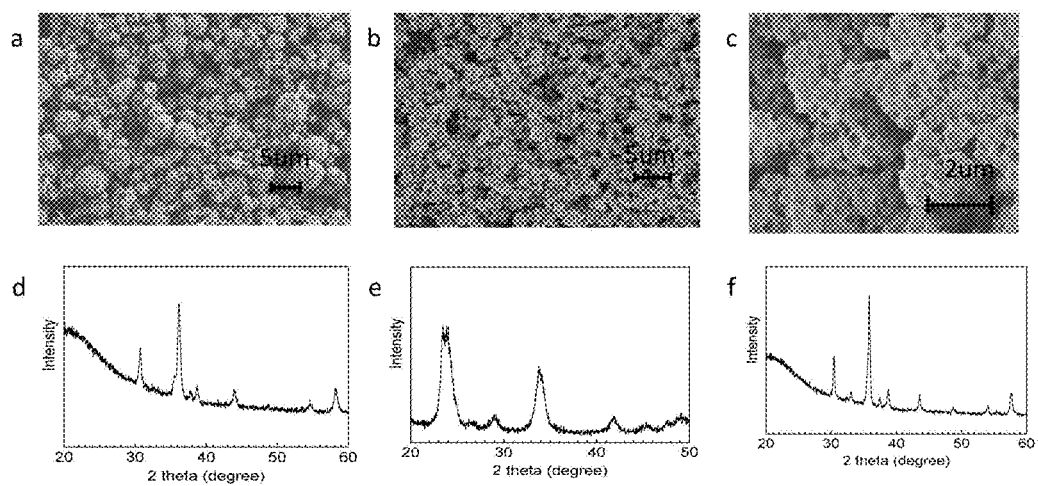
FIG. 8 SEM images and XRD analysis of the synthesized 3DMM CuCoMnWOx material array based on ink-jet printing assembly method. (a) SEM image of CuCoMnO$_4$; (b) SEM image of W$_{0.7}$Mo$_{0.3}$O$_3$; (c) SEM image of Cu$_{1.5}$Mn$_{1.5}$O$_4$ material; (d) XRD of CuCoMnO$_4$; (e) XRD of W$_{0.7}$Mo$_{0.3}$O$_3$; (f) XRD of Cu$_{1.5}$Mn$_{1.5}$O$_4$ material

The printed thin film array was heated to 60° C. during printing. After the solvent was evaporated up, the sample was calcined in a muffle furnace in air at 300-800° C. for 2 hours with a ramp of 1-10° C./min. During this calcination process, the precursors were decomposed. The silica nanospheres and silica nanoparticles were removed by treating the sample with diluted NaOH aqueous solution with a concentration of 1-10 wt %. The final 3DMM single, binary, ternary and quaternary CuCoMnWO$_x$ material array was thus synthesized. FIG. 8 shows the SEM images and XRD analysis of the synthesized 3DMM CuCoMnWOx material array based on ink-jet printing assembly method. FIG. 8 (a, b, and c) shows the SEM image of CuCoMnO$_4$, W$_{0.7}$Mo$_{0.3}$O$_3$, and Cu$_{1.5}$Mn$_{1.5}$O$_4$ material. We can find that both of the macropore and the mesopore are open pores and these pores are connected with each other to form a continuous 3D pore space. From the XRD of CuCoMnO$_4$, W$_{0.7}$Mo$_{0.3}$O$_3$ and Cu$_{1.5}$Mn$_{1.5}$O$_4$ in FIG. 8, we can find that the binary and ternary materials generated by multi-channel direct-deposit assembly method.

What is claimed is:

1. A method of forming an array of structured material containing macropores and mesopores, comprising:
    preparing a plurality of pore-forming template agent solutions, wherein each of the plurality of pore-forming template agent solutions comprises at least one macropore-forming template agent, at least one mesopore-forming template agent, and a first amphoteric solvent, wherein the macropore-forming template agent is silica nanoparticles and carbon nanospheres, and wherein the mesopore-forming template agent is a polymer;
    preparing a plurality of precursor solutions, wherein each of the plurality of precursor solutions comprises a precursor selected from the group consisting of metal species metal nanoparticles, organosilicate, and a mixture thereof and a second amphoteric solvent; and depositing, by inkjet printing, an as-synthesized array of dots onto a substrate, wherein each of the as-synthesized array of dots is a mixture of at least one of the plurality of precursor solutions and at least one of the plurality of pore-forming template agent solutions.

2. The method of claim 1, further comprising:

filling each of a first set of channels in an inkjet printer with at least one of the plurality of precursor solutions;

filling each of a second set of channels in the inkjet printer with at least one of the plurality of pore-forming template agent solutions; and during the depositing step, dispensing a first volume of the at least one of the plurality of precursor solutions from one of the first set of channels and a second volume of the at least one of the plurality of pore-forming template agent solutions in each dot in the as-synthesized array of dots.

3. The method of claim 1, further comprising:

evaporating the as-synthesized array at 20-500° C. to remove the amphoteric solvent to form an as-synthesized film array.

4. The method of claim 3, further comprising:

removing the pore-forming template agents in the as-synthesized film array by heating at 100-1000° C., by etching using a NaOH solution or a HF solution, or both to obtain the array of structured material.

5. The method of claim 2, wherein, the first volume and the second volume is controlled according to a software program so that the a composition of each dot in the as-synthesized array of dots is controllable.

6. The method of claim 1, wherein the first amphoteric solvent and the second amphoteric solvent are the same or different, each is chosen from water, alcohol, acid, alkali, acetone, or mixtures thereof.

7. The method of claim 6, wherein said alcohol is chosen from methanol, ethanol, propanol, butanol, glycerol, or mixtures thereof.

8. The method of claim 6, wherein said acid is chosen from formic acid, acetic acid, nitric acid, hydrochloric acid, sulfuric acid, citric acid, or mixtures thereof.

9. The method of claim 6, wherein said alkali is chosen from ammonia, sodium hydroxide, potassium hydroxide, or mixtures thereof.

10. The method of claim 1, wherein said metal species is one or more metals, metal salts, or metal alkoxide chosen from main group metals, transition metals, lanthanide metals, actinide metal, nitrates, carbonates, acetates, chlorates, or alkoxides.

11. The method of claim 1, wherein said substrate is chosen from paper, membrane, glass, corundum, ceramic, silicon wafer, steel, wood, quarts, or a circuit board.

12. The method of claim 1, wherein a size of the macropores in the structured material is in a range of 50-1000 nm, a size of the mesopores in the structured material is in a range of 1-50 nm, and wherein a surface area of the structured material is in a range of 20-1000 $m^2/g$.

13. The method of claim 1, wherein the structured material comprises metal oxide composites, metal/metal oxides composites, metal/reduced graphene oxide (rGO) composites, metal oxide/rGO composites, metal/carbon nanotube (CNT) composites, metal oxide/CNT composites, metal/Mxene composite, or metal oxide/Mxene composite.

14. The method of claim 1, wherein the polymer is a block copolymer that is PEG-PPG-PEG or $EO_{96}PO_{70}EO_{96}$.

* * * * *